March 14, 1967  E. C. WOODCOCK  3,309,079
FEEDING OF CUT FILMS
Filed March 25, 1965　　　　　　　　　　　　　　2 Sheets-Sheet 1
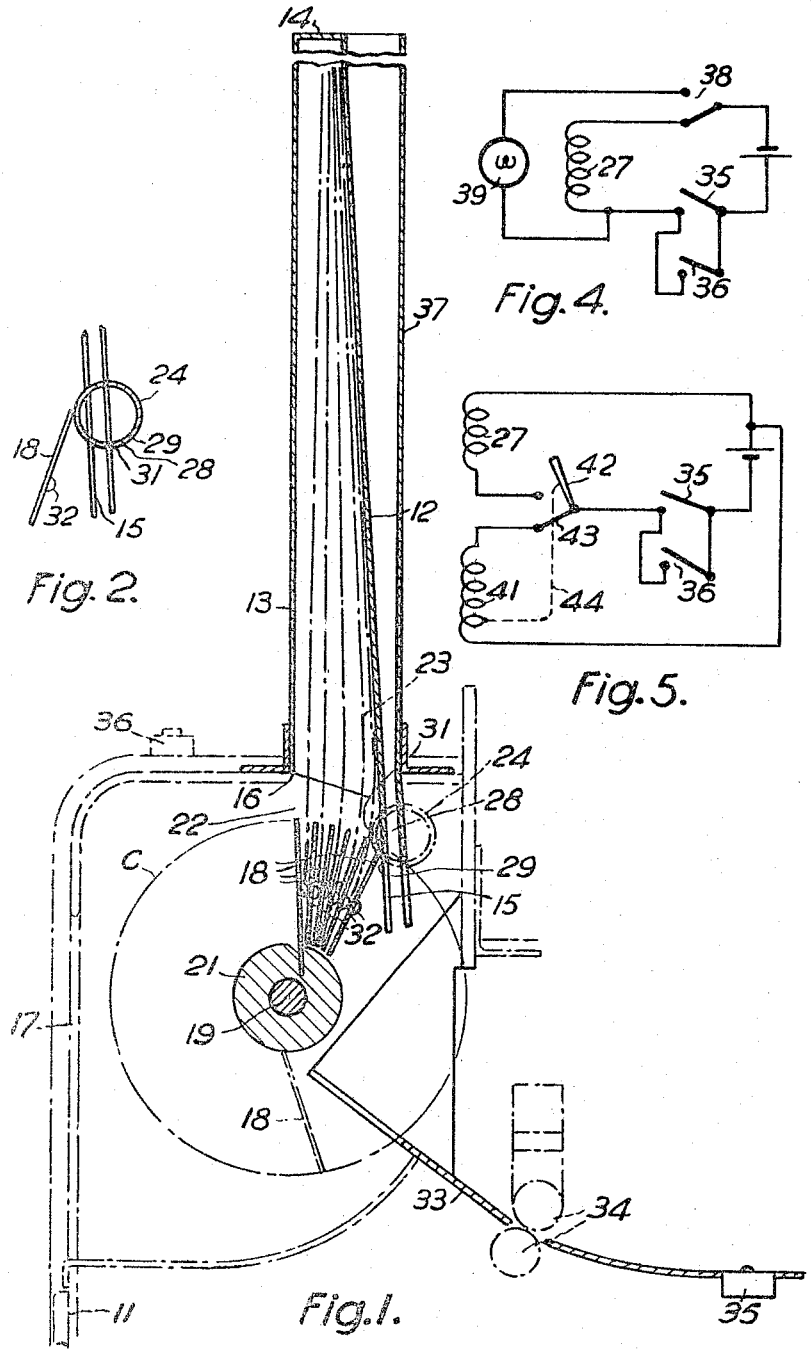
Inventor
Edward C. Woodcock
By
Watson, Cole, Grindle & Watson
Attys

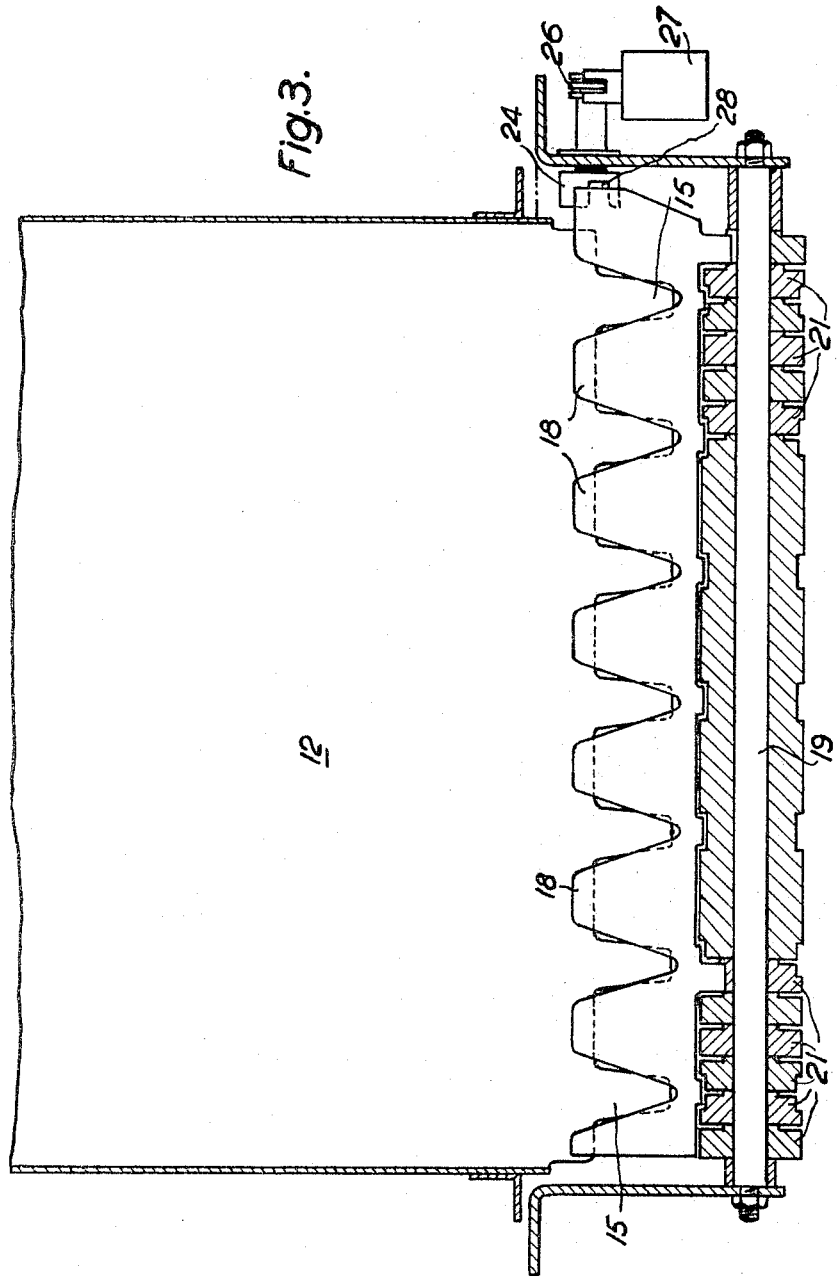

United States Patent Office 3,309,079
Patented Mar. 14, 1967

3,309,079
FEEDING OF CUT FILMS
Edward Cecil Woodcock, Willesden Green, London, England, assignor to Williamson Manufacturing Company Limited, Willesden Green, London, a British company
Filed Mar. 25, 1965, Ser. No. 442,637
10 Claims. (Cl. 271—18)

This invention relates to the processing of flexible material in cut sheets, for example cut films such as are used for example in X-ray work, or cut photographic paper. For convenience cut films will be referred to without limitation thereto being implied.

Such apparatus is usually provided with feed devices such as rollers at such close intervals that a film of any length within a range once fed in between the first pair of rollers will be automatically carried right through the apparatus. The apparatus is set up in a dark room and the films are fed in one at a time by an operator who must be sure that adequate intervals are allowed to prevent films overlapping. On the other hand excess intervals must be avoided if time is not to be wasted. This involves close attention and continuously occupies the operator during the processing of a batch of films.

An object of the invention is to provide such apparatus with means enabling a batch of films of any lengths within the range to be provided for and of any number up to the maximum the means will accept, to be quickly loaded into the apparatus, whereafter they are automatically fed forward at close intervals.

The apparatus according to the invention in addition to a main casing in which the processing proper takes place, comprises a generally vertical, open-bottomed storage compartment mounted in the main casing, an externally accessible opening being provided through which access can be obtained to the bottom of the compartment, a plurality of flaps rotatable on a common axis below the storage compartment and of such length that when swung into upwardly directed position their upper edges come between the front and rear walls of the compartment but clear of the lower edge of the front wall and sufficiently below the lower edge of the rear wall, thus enabling the flaps to swing past the front wall and leaving a slot at the rear through which the flaps can be swung manually and cut sheets can be loaded manually into the compartment with the sheets alternating with the flaps, an escapement for releasing that flap nearest the front wall of the compartment from its upwardly directed position, the axis on which the flaps rotate being disposed so that gravity urges the flaps towards the front wall of the compartment and as each flap is released it continues to rotate by gravity and the cut sheet behind it is also released, a power driven feed device, suitably a pair of rollers, in front of and below the storage compartment, a guide which directs each cut sheet as it is released to the feed device, means beyond the feed device engaged by a cut sheet to actuate the escapement and thus release the next flap at an interval adequate to prevent overlap of cut sheets within the processing operations, and means enabling the escapement to be actuated when the compartment has been loaded and before any cut sheet has been released.

The terms rear and front are used herein to indicate respectively nearer to and further from the end at which the films are loaded into the apparatus.

It will be clear that there is no need to load the storage compartment fully, and that the rate of release of the flaps is determined by the passage of the films through the processing operations. If the means engaged by a film to actuate the escapement and thus release the next flap is arranged to operate at the passage of the trailing edge of the film, the linear intervals between successive films will be constant and can be left at a minimum whereas if it operates at the passage of the leading edge, the total interval per film will be constant and must be made adequate for the maximum length within the range to be provided for.

The storage compartment can be loaded up as opportunity arises and with any number of films up to complete loading. The invention is especially applicable to apparatus of comparatively small output and in which accommodation for about half a dozen files is sufficient.

The invention will be further described with reference to the accompanying diagrammatic drawings in which:

FIGURE 1 is a side view partly in section of apparatus according to the invention.

FIGURE 2 is a detail showing a different position of the escapement from that of FIGURE 1.

FIGURE 3 is a front view partly in section of FIGURE 1 and

FIGURES 4 and 5 are circuit diagrams.

The drawings show part only of a main casing 11 in which the processing proper of cut films takes place. The actual processing is itself well known and therefore does not need to be illustrated or described.

At the entry end of the main casing 11 is mounted a storage compartment having a front wall 12, rear wall 13 and top 14. The lower edge of the front wall 12 is at 15 and that of the rear wall 13 at 16. The bottom of the storage compartment is open and an external opening 17 is through which access can be obtained to the bottom of the compartment. Within the main casing a plurality of flaps 18 are continuously rotatable about the axis of a shaft 19 below the storage compartment on which they are journalled by respective hubs 21. The flaps 18 are of such length and their upper edges and the edge 15 are so shaped (as will be described) that from the upwardly directed position shown in FIGURE 1 the flaps can swing clockwise in FIGURE 1 past the wall 12. Further the edge 16 is located to leave a slot 22 spaced from the opening 17, which permits the flaps to swing into the position of FIGURE 1 and the cut films to be loaded into the compartment alternating with the flaps as will be described in greater detail below.

When the compartment is loaded, as shown in FIGURE 1 the leading flap 18 has its outer edge adjacent the wall 12, the first loaded cut film 23 is behind it, another flap 18 follows, then another cut film 23 and so on alternately, the leading flap being retained by an escapement. The shaft 19 is so disposed (to the left in FIGURE 1) that all the flaps tend to rotate by gravity clockwise as seen in FIGURE 1. When a film is to be released, the escapement is actuated, so releasing the leading flap 18 and gravity causes leading flap to turn through about 180° until it hangs downwards and when that flap is next used to retain and separate a newly loaded film it is manually swung through nearly the remainder of the circle. The chain line circle C indicates the path of the outer edge of the flap during their two movements. In the illustrated example, the escapement engages the flaps 18 themselves and is constituted by a slotted hollow cylinder 24 which can be oscillated on an axis parallel to the axis of the shaft 19 through an angle of about 90° by the aid of an arm 26 linked to the core of a solenoid 27. The cylinder 24 is located so that the leading flap 18 has an outer corner lodged in the slot 28 as shown in FIGURE 1. When the cylinder is rocked counter clockwise in FIGURE 1, as shown in FIGURE 2 the retaining edge 29 of the slot moves clear of the flap and allows it to fall, but at the same time the other edge 31 of the slot has moved into the path of the next flap. When the cylinder returns to its original position the corner of the next flap drops into the slot ready to be released the next time the escapement is operated. As each flap is released the sequence of flaps moves forward under the action of gravity.

This form of escapement requires that space should be left between the outer edges of the flaps so that the rear edge of the slot can enter between the two leading flaps. Such spacing is here ensured by a lug or lugs 32 at the end of each flap which abuts and spaces it from the next flap by the necessary amount when the flap is in the loaded position.

As each flap 18 is released and swings down clockwise in FIGURE 1 it allows the corresponding film 23 to be fed by gravity out of the compartment. The lower edge of the film engages a guide plate 33 which leads it to power driven rollers 34 which forward it into the processing section of the apparatus. To ensure that the film cannot miss the guide plate 33, the outer portions of the flaps 18 and the rear portion of the guide plate are shaped to inter-mesh with one another, for example they may be of saw tooth outline as in FIGURE 3 or they might be of square toothed outline. The apparatus is in the usual way equipped with feed devices such as rollers at suitable intervals to ensure that the films of the shortest length will be carried right through. Associated with these feed devices and beyond the pair of rollers 34 is a switch or switches 35 which causes the escapement to be actuated through the solenoid 27 at a suitable interval after a film has entered the processing section. If there are any films being held back by flaps in the compartment they will accordingly follow one another at appropriate intervals while if the compartment is empty the flaps will all be hanging down and the operation of the escapement following the last film will be ineffective. When the compartment has been re-loaded and before any film has been released the first flap and film can be released under the control of a manual switch 36.

Assuming the compartment is empty, to load it the first downwardly hanging flap 18 is swung round by hand clockwise in FIGURE 1 until its corner lodges in the slot 28 in the escapement cylinder 24. In this position as above mentioned its outer edge is adjacent the front wall 12 of the compartment. The compartment may as shown taper upwardly since the total thickness of the number of films which can be accommodated between all the flaps 18 is much smaller than the space occupied by the flaps due to the spacing lugs 32. The front wall 12 of the compartment may as shown slope a little backwards while the rear wall 13 is vertical and its height is sufficient to receive the longest film to be accommodated with its lower edge clear of the flaps when swung up.

After the first flap 18 is retained by the escapement cylinder, a film 23 is introduced into the compartment from the lower end through the opening 17 and slot 22 and its lower edge then allowed to descend until it rides on the hubs 21 of the flaps 18. The next flap is then swung up so that the lower margin of the first film is between the first two flaps. Further films are then similarly introduced, another flap being swung up after each film. Any number up to the maximum i.e. one less than the total number of flaps can be loaded, but the apparatus will work with any smaller number.

To enable a film to be fed into the processing section proper without going through the storage compartment there may be an open topped passage to the front of the storage compartment, suitably formed between the front wall 12 of the compartment and another wall 37 in front of this. This passage opens above the guide plate 33 and as its lower edges are desirably below the level of the escapement i.e. below the outer edge of the first flap 18 in the loaded position, the lower margin of the wall 37 as well as the wall 12 being cut away to mesh with the toothed outline of the flaps above described.

It is important that a film inserted in this way (which may for convenience be termed an emergency film) does not get in simultaneously with films being automatically released by the escapement. Accordingly as shown in FIGURE 4 a selector switch 38 may be provided which cuts out the action of the escapement by substituting a signal 39 for the solenoid 27. Then the arrival of any film going through the processing section at the position at which the escapement would next be actuated i.e. the switch 35, causes a signal to be given which indicates to the operator that an emergency film can now be inserted. Alternatively as shown in FIGURE 5 the emergency entry can be provided with a separate escapement of its own indicated by the solenoid 41 and an interlocking switch control 42. This leaves the switch 35 open but actuates a selector switch 43 which connects the switch 35 to the solenoid 41 instead of to the solenoid 27 so that when the next film would have been released by the closing of the switch 35 the main escapement is not actuated but the separate escapement is and admits the emergency film. The operation of the separate escapement is arranged, e.g. by a mechanical link indicated at 44, to restore the control 42 and selector switch 43 so that normal operation of the main escapement is set in action again when the emergency film has passed far enough through the actual processing section, i.e. actuates the switch 35.

Although control by electric switches has been provided in the illustrated example, it would be possible to substitute mechanical devices having the same action. Electric switches are however usually more convenient.

Again, in place of a solenoid to actuate the escapement, some other form of electric motor may be used.

What I claim is:

1. Apparatus for the processing of flexible material in cut sheets which in addition to a main casing in which the processing proper takes place, comprises a generally vertical, open-bottomed storage compartment mounted on the main casing, an external opening being provided through which access can be obtained to the bottom of the compartment, a plurality of flaps continuously rotatable on a common axis below the storage compartment and of such length that when swung into upwardly directed position their upper edges come between the front and rear walls of the compartment but clear of the lower edge of the front wall and sufficiently below the lower edge of the rear wall, thus enabling the flaps to swing past the front wall and leaving a slot at the rear through which the flaps can be swung manually and cut sheets can be loaded manually into the compartment with the sheets alternating with the flaps, an escapement for releasing that flap nearest the front wall of the compartment from its upwardly directed position, the axis on which the flaps rotate being disposed so that gravity urges the flaps towards the front wall of the compartment and as each flap is released it continues to rotate by gravity and the cut sheet behind it is also released, a power driven feed device in front of and below the storage compartment, a guide which directs each cut sheet as it is released to the feed device, means beyond the feed device engaged by a cut sheet to actuate the escapement and thus release the next flap at an interval adequate to prevent overlap of cut sheets within the processing operations, and means enabling the escapement to be actuated when the compartment has been loaded and before any cut sheet has been released.

2. Apparatus according to claim 1 in which the means engaged by a cut sheet to actuate the escapement and thus release the next flap is arranged to operate at the passage of the trailing edge of the sheet.

3. Apparatus according to claim 1 in which the flaps are arranged so that each turns through about 180° when released by the escapement and is then manually rotated through nearly the remainder of the circle when brought into its upwardly directed position to separate and retain a cut sheet newly loaded into the storage compartment.

4. Apparatus according to claim 1 in which the escapement engages the flaps themselves.

5. Apparatus according to claim 4 in which the escapement is constituted by a hollow cylinder which can be oscillated on an axis parallel to the axis on which the flaps rotate, through an angle of about 90°, the cylinder being located so that the leading flap to be released has an outer corner lodged in the slot, means such as a lug or lugs at the end of each flap which abuts the next flap being provided to space the flaps apart to enable the rear edge of the slot to enter between the two leading flaps and into the path of the second flap when the cylinder is rocked to release the leading flap.

6. Apparatus according to claim 1 in which the guide is a plate and the rear portion of the guide plate and outer portions of the flaps are shaped and located to intermesh.

7. Apparatus according to claim 1 in which the escapement is electrically actuated and the means engaged by the cut sheet beyond the feed device includes electric control means for said escapement.

8. Apparatus according to claim 1 incorporating an open topped passage to the front of the storage compartment and leading to the guide so enabling a cut sheet to be entered without going through the storage compartment, a control being provided to prevent a cut sheet inserted in this way from getting in simultaneously with sheets being automatically released by the escapement.

9. Apparatus according to claim 8 in which the control comprises a selector switch which cuts out the action of the escapement and causes a signal to be given when any out sheet on its way from the storage compartment arives at the position at which the escapement would next have been actuated.

10. Apparatus according to claim 8 in which the open topped passage is provided with a separate escapement of its own and the control causes the main escapement associated with the storage compartment to be cut out of action when the next sheet would have been released and the separate escapement to be actuated, the sheet so admitted through the open-topped passage after progressing for enough into the apparatus causing the main escapement to be set in action again.

References Cited by the Examiner

UNITED STATES PATENTS

| | | | |
|---|---|---|---|
| 673,760 | 5/1901 | Conner | 221—86 |
| 3,110,490 | 11/1963 | Limberger | 271—36 |

ROBERT B. REEVES, *Primary Examiner.*

HADD S. LANE, *Examiner.*